United States Patent [19]

Eckman

[11] Patent Number: 5,054,968
[45] Date of Patent: Oct. 8, 1991

[54] MECHANICAL POSITIVE FEED DRILL WITH SUPPORTED SPINDLE

[75] Inventor: Richard E. Eckman, Houston, Tex.

[73] Assignee: Dresser Industries, Inc., Dallas, Tex.

[21] Appl. No.: 599,845

[22] Filed: Oct. 18, 1990

[51] Int. Cl.$^5$ ............................................. B23B 45/14
[52] U.S. Cl. ...................................... 408/97; 408/129
[58] Field of Search ................... 408/14, 16, 11, 129, 408/130, 10, 138, 95, 97, 79, 84, 241.6; 173/18, 19, 165; 409/218

[56] References Cited

U.S. PATENT DOCUMENTS

| | | | |
|---|---|---|---|
| 1,256,471 | 12/1918 | Genero | 408/138 |
| 1,541,062 | 6/1925 | Myers | 408/14 |
| 2,567,511 | 9/1951 | Edler | 408/14 |
| 2,640,377 | 6/1953 | Millholland, Jr. | 408/14 |
| 3,509,793 | 5/1970 | Muhl | 408/14 |
| 3,583,822 | 6/1971 | Alexander et al. | 408/11 |
| 3,709,621 | 1/1973 | Wake | 408/11 |
| 3,859,001 | 1/1975 | Hoddinott et al. | 408/3 |
| 3,865,010 | 2/1975 | Hodgson | 29/65 |
| 3,884,592 | 5/1975 | Shulters | 408/14 |
| 4,083,646 | 4/1978 | Vindez | 408/133 |
| 4,418,767 | 12/1983 | Vindez | 173/19 |
| 4,538,943 | 9/1985 | Clifton et al. | 408/72 B X |
| 4,557,646 | 12/1985 | Biek | 409/218 |
| 4,591,299 | 5/1986 | Eckman | 408/1 |
| 4,592,681 | 6/1986 | Pennison et al. | 408/10 |
| 4,668,134 | 5/1987 | Vindez | 408/97 |
| 4,681,490 | 7/1987 | Pennison et al. | 408/10 |
| 4,799,833 | 1/1989 | Pennison et al. | 408/132 |
| 4,813,822 | 3/1989 | Biek | 408/14 |
| 4,911,587 | 3/1990 | Stych | 408/79 |

FOREIGN PATENT DOCUMENTS

| | | | |
|---|---|---|---|
| 1175530 | 8/1964 | Fed. Rep. of Germany | 408/97 |
| 1167173 | 11/1958 | France | 408/14 |
| 1098758 | 6/1984 | U.S.S.R. | 408/14 |

OTHER PUBLICATIONS

A. B. Quackenbush Co. Tool Drawing & Parts List.
Dresser Industries, Inc. Quackenbush Positive Feed Drill Operating Instructions, Jan. 25, 1988.

Primary Examiner—William Briggs
Attorney, Agent, or Firm—Johnson & Gibbs

[57] ABSTRACT

An improved automatic feed drill including a housing, a rotatable tool spindle located for reciprocating movement in the housing, driving means located in the housing operably connected with the spindle for rotating and reciprocating the spindle in feed and retraction movements, and structure for supporting the spindle including a nose assembly secured with the housing around the drilling end of the spindle having a telescoping section with a bore concentric with the spindle, and a bearing on the spindle drilling end fitted in sliding relation in the nose bore for piloting the spindle and a drill connected thereto during reciprocating movement of the spindle. A right angle form of the feed drill further include drive threads on the spindle having a flat crest, and a closely fitting bushing in the head of the drill around the upper end of the spindle, the bushing having a concentric bore fitting in close piloting relation with the drive thread crest for holding the upper end portion of the spindle against lateral movement as the spindle reciprocates.

19 Claims, 4 Drawing Sheets

MECHANICAL POSITIVE FEED DRILL WITH SUPPORTED SPINDLE

FIELD OF THE INVENTION

This invention relates to mechanical positive feed type drills and more particularly relates to mechanical feed drills with supported spindles.

BACKGROUND OF THE INVENTION

Positive feed drills are available where the feed is accomplished with a lead screw geared directly to spindle rotation. Other mechanical feed drills are of the differential gear feed type. The majority are right angle drills, while a few are straight, in-line drills. Some such drills are of the peck type which reciprocate rapidly for effective chip control.

Right angle drills were developed primarily for use in small, confined areas which could not accommodate larger straight in-line drills and related tools. Right angle drills offer more power and thrust in smaller, lighter packages than other forms of available drills. Approximately forty percent (40%) of all holes drilled in aerospace structures, where the drill motor is portable and fixtured are drilled with right angle, positive feed drills with differential gear feeds.

Spindle rigidity and concentricity are major problems which have plagued drills, particularly right angle drills. Generally, right angle drill spindles are supported by the thread in the feed gear and the outside diameter fit of the drive gear inside the drill head together with the outside diameter fit of the drill bit inside a drill bushing in the lower end of the tool nose. Such drill spindles, especially in worn drills, can often be visibly shaken when in the assembled state. Such loose drill spindles have been taken for granted in the aerospace industry. Since acceptable tolerances have not been met using such drills, a reaming operation has generally followed the drilling of each hole to meet aircraft quality standards.

One form of drill which has been developed to overcome the quality control problems which have been inherent in drills used in the aerospace industry is known as a "Peck Drill" which produces holes within a few thousands of drill bit diameter without the necessity for reaming This is an air feed type drill including the motor, gear train, and spindle journaled in bearings within a sleeve. The sleeve fits in a close bore in the drill housing with an air cylinder moving the entire assembly outwardly to feed the bit into the work piece. The spindle is rigidly supported and turns extremely accurately. The sleeve is a quill providing spindle support which is also equidistant from the drill bit tip. Such a drill bit design has been successful for smaller drill sizes, but the thrust limitations have prevented the use of such drills with larger drill bits.

It is an object of this invention to produce mechanical positive feed drills with supported spindles.

It is another object of this invention to provide a new and improved right angle, differential gear feed drill having a supported spindle.

It is another object of the invention to provide a right angle positive feed drill of the character described which has spindle concentricity and rigidity to improve the quality of holes drilled.

SUMMARY OF THE INVENTION

One form of this invention provides an improved automatic feed drill that includes a housing, a rotatable tool spindle located for reciprocating movement in the housing, driving means located in housing operably connected with the spindle for rotating and reciprocating the spindle in feeding and retraction movements, and spindle support structure to maintain the concentricity and rigidity of the spindle including a tool nose secured below the tool head having a bore concentric with the spindle, and a ball bearing unit on the spindle slidable in and piloted by the concentric bore. Another form of the invention also includes a flat crest driving thread along the spindle, a bushing on the drill housing above the head piloting the outside diameter of the spindle. In a preferred embodiment of the drill, the nose is a two-piece telescoping assembly having an upper nose section provided with a concentric bore for piloting the ball bearing unit on the spindle and a lower section slidable on the upper section and provided with a concentric drill bushing for piloting a drill bit secured in the spindle.

The spindle bushing in the drill head and the ball bearing unit in the concentric nose bore holds the spindle and bit true and concentric during the operation of the drill.

BRIEF DESCRIPTION OF THE DRAWINGS

The foregoing and additional objects and advantages of the invention will be apparent from the following detailed description read in conjunction with the accompanying drawings wherein.

DETAILED DESCRIPTION OF THE PREFERRED EMBODIMENT

Figure 1:
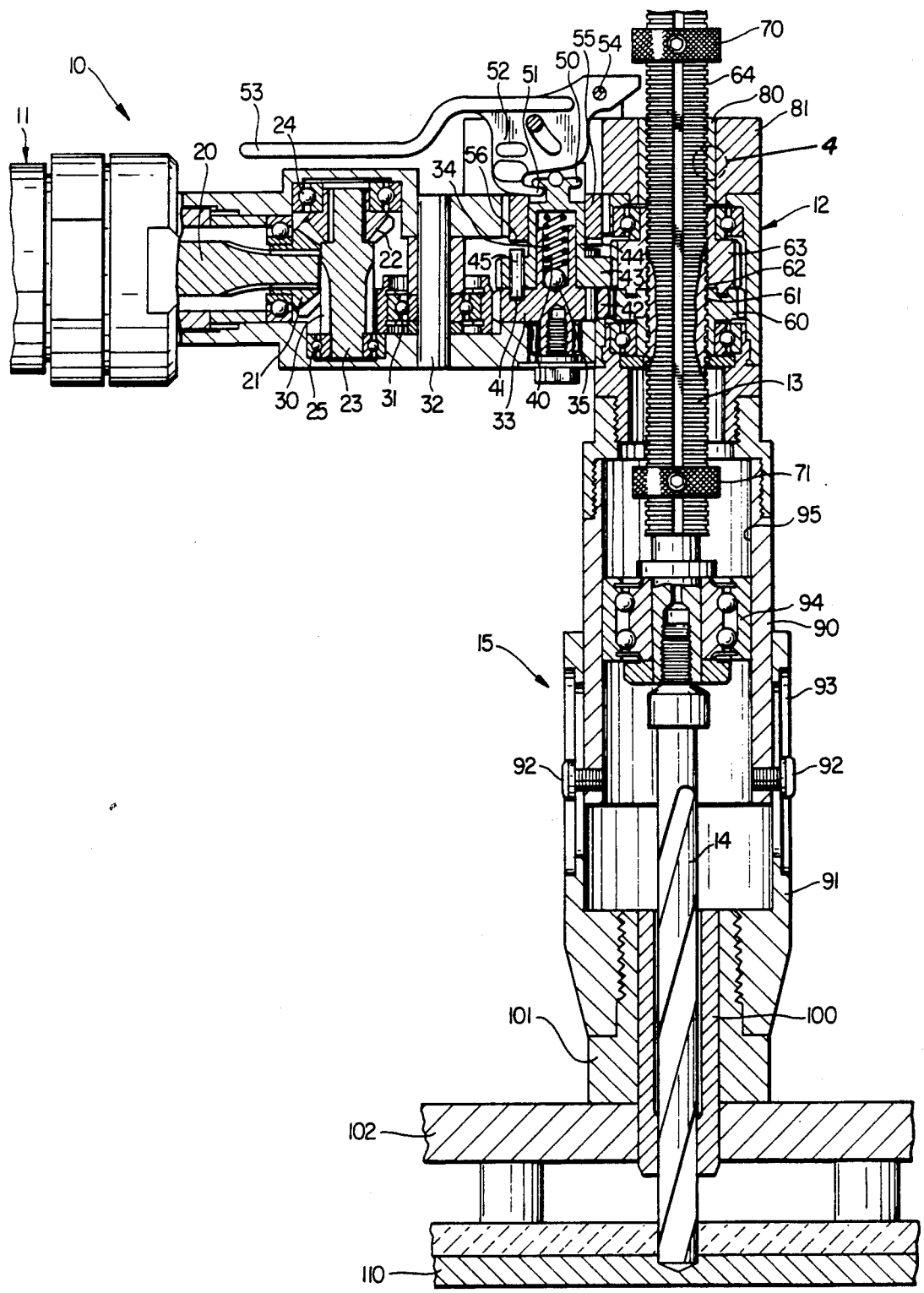
FIG. 1 is a fragmentary longitudinal side view in section and elevation of a right angle automatic feed drill embodying the features of the invention, showing the drill in the drilling mode.

Referring to the drawings, an automatic feed drill 10 constructed in accordance with the invention includes a motor 11, which may be either a pneumatic or other type of motor, as desired, a right angle feed head 12 which includes gear assemblies for transmitting power to a spindle 13 to rotate and reciprocate the spindle and a drill bit 14 attached to and driven by the lower end of the spindle, and a spindle support assembly 15 constructed in accordance with the invention. A positive feed right angle drill to which this invention applies is illustrated in U.S. Pat. Nos. 4,592,681 issued July 3, 1986 and 4,681,490 issued July 21, 1987. The spindle support apparatus holds the drill bit to extremely close tolerances as the bit is rotated and raised and lowered by the drive system of the drill. Referring to FIG. 1, the motor 11 powers a main drive shaft 20 connected with a bevel gear 21 which meshes with a bevel gear 22 on a shaft 23 rotatably supported by ball bearing units 24 and 25. The shaft 23 has a spur gear portion 30 which meshes with and drives an idler gear 31 on a shaft 32. A main drive gear 33 is mounted in the head 12 meshing with and driven by the idler gear 31. The main drive gear has an upwardly extending hollow portion 34 housing a ball 35 and a spring 40. The upper face of the main drive gear 33 has an annular recess 41 provided with an upwardly extending lug 42. A first spindle feed gear 43 is mounted above the main gear 33 operating on the same axis as the main gear and having an upwardly extending hollow portion 44 mounted and rotating on the hollow portion 34 of the main gear. The feed gear 43 has circumferentially spaced upwardly and downwardly extending drive pins 45, the lower end portions of which engage the annular recess in the upper face of the main gear 33 and are engageable by the lug 42 to drive the feed gear 43. In FIG. 1, the feed gear 43 is in driving engagement with the main drive gear 33. The spring 40 in the reduced upwardly extending portion of the main drive gear 33 biases the first feed gear 43 and the reduced upper portion 44 of the feed gear upwardly disengaged from the main drive gear. The reduced hollow upper portion 44 of the first drive gear 43 is provided with an annular operator flange 50 which is engageable by a control finger 51 on the body 52 of a feed shift lever 53. The shift lever body is pivotly mounted on a shaft 54 which permits the shift lever to move between the feed mode of FIG. 1 and the retraction mode of FIG. 3. When the first feed gear 43 is at the lower position of FIG. 1, the feed gear is driven by the main gear 33. When the first gear is at the upper position of FIG. 3, it is disengaged from the main drive gear 33, and thus, is not rotating causing the retraction upwardly of the spindle 13 and drill 15 as described in more detail hereinafter. An annular stop member 55 encircles the reduced portion 44 of the first feed gear 43. The lower face of the stop member 55 has an annular recess provided with circumferentially spaced lugs 56 engageable by the pins 45 to stop the rotation of the first feed gear 43 when the feed gear is in the upper position of FIG. 3.

A spindle rotation gear 60 is mounted in the feed head on the spindle 13 meshing with the main drive gear 33 for rotating the spindle to drive the drill bit 14. The spindle drive gear 33 has circumferentially spaced internal longitudinal drive lugs 61 along the bore of the gear which mesh with circumferentially spaced longitudinal slots 62 formed along the surface of the spindle 13 so that the spindle may move through the spindle rotation gear as the spindle is rotated and moved downwardly and upwardly. A second spindle feed gear 63 is mounted on the spindle 13 above the spindle rotation gear 60. The second spindle feed gear 63 meshes with the first spindle feed gear 43 to permit the first feed gear to drive the second feed gear for moving the spindle 13 downwardly during drilling. The bore through the second feed gear 63 is provided with threads which mate with threads 64 formed on and extending substantially the full length of the spindle 13. As discussed hereinafter, differences in the relative turning speeds of the spindle rotation gear 60 and the second spindle feed gear 63 cause the spindle to move downwardly and upwardly.

An upper stop collar 70 is mounted on the spindle above the feed head to limit the downward movement of the spindle. A lower stop collar 71 is mounted on the spindle 13 below the feed head to limit the retraction upwardly of the spindle.

Figure 5:
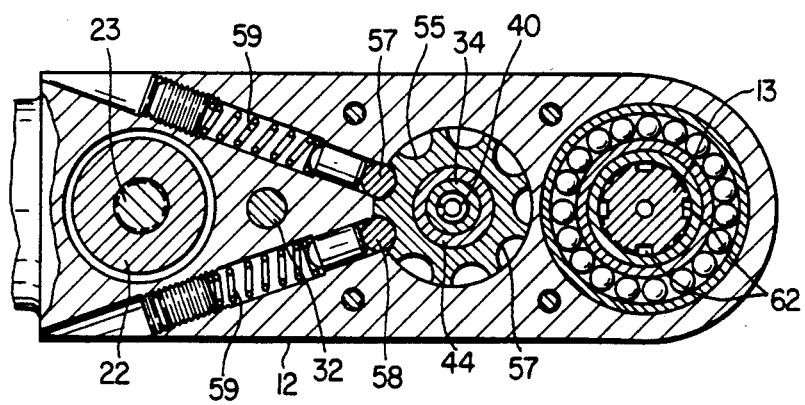
FIG. 5 is a fragmentary view in section along the line 5—5 of FIG. 2 illustrating rachet type stop assembly for the first feed gear 43.

Referring to FIG. 5, the exterior of the stop member 55 is provided with a plurality of circumferentially spaced recesses 57 that are sized to receive a pair of detents 58. The detents are urged to resilient engagement with the stop member 55 by springs 59. Thus, it can be seen if the feed gear 43 is caused to rotate when the pins 45 are engaged with the lugs 56 of the stop member 55, the stop member 55 will also rotate displacing the detents 58 against the springs 59 somewhat similar to racheting action.

Figure 4:
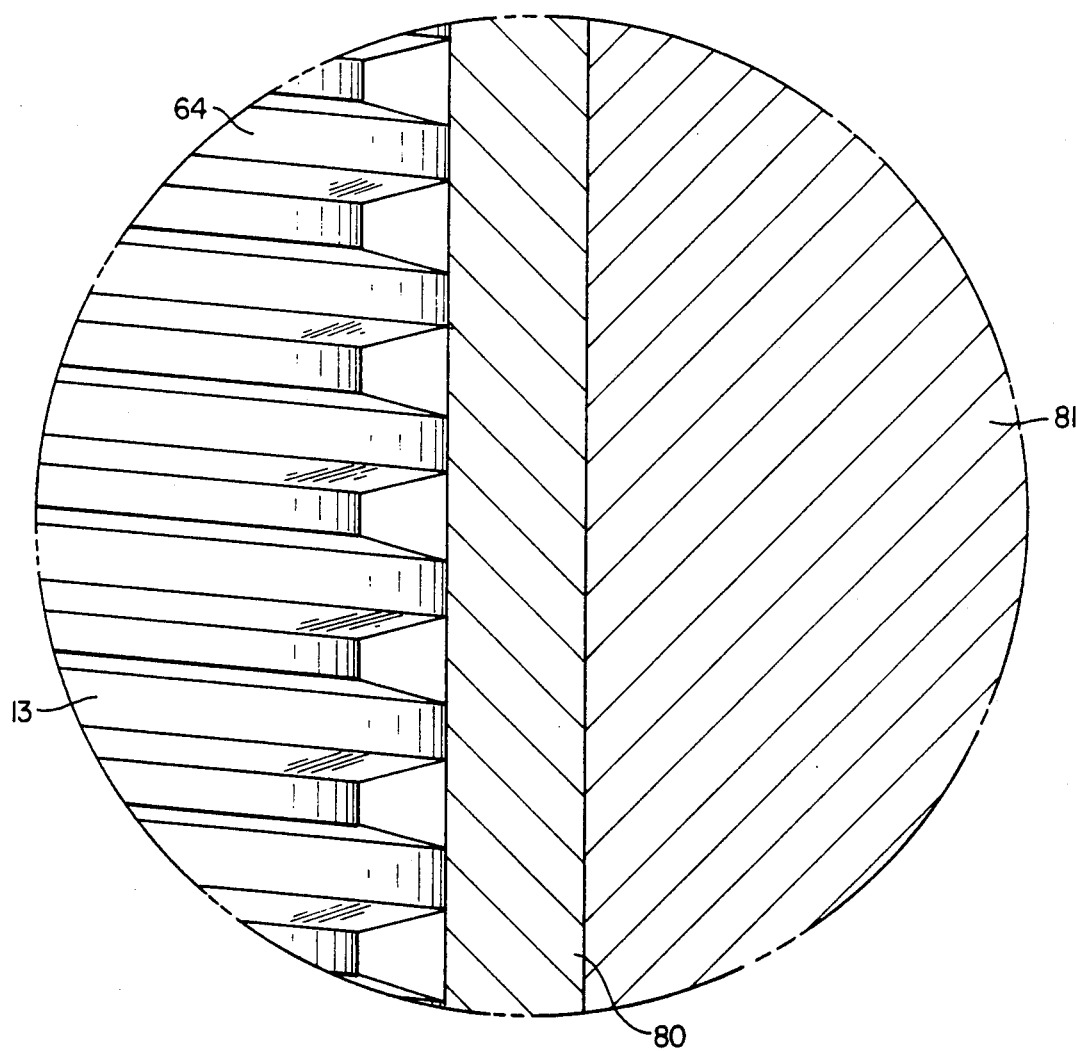
FIG. 4 is a fragmentary enlarged view of the spindle threads, spindle bushing, and a portion of the drill head in the area 4 identified in FIG. 1.

In accordance with the invention, the spindle 13 is supported along a lower end portion by the assembly 15 and along an upper end portion by an upper spindle bushing 80 mounted in a feed head housing stop body 81. Referring to both FIGS. 1 and 4, the threads 64 on the spindle 13 are flat top acme threads the flat crests of which form a substantially smooth cylindrical profile along the surface of the spindle which moves in sliding relationship in the bore of the bushing 80 so that the outside diameter of the spindle is piloted in the bushing. The bushing is preferably formed of very hard tool steel. The support assembly 15 includes a tubular upper nose half-section 90 and a tubular lower nose half-section 91 which fits in sliding telescoping relationship on the upper nose half-section. The upper nose half-section has oppositely positioned guide screws 92 which fit in longitudinal slots 93 along the opposite sides of the lower nose half-section attaching the two half-sections together and permitting the lower half-section to telescope on the upper half-section for adjusting the overall length of the nose assembly. The upper end of the upper half-section 90 is secured to the housing of the drive head assembly 12. A ball bearing unit 94 is mounted along the lower end portion of the spindle 13 piloted in the bore 95 of the upper nose half-section 90. The upper nose half-section 90, like the bushing 80, is also formed of a hard tool steel and the bore 95 is a very precise concentric ground bore permitting the ball bearing 94 to slide within the bore while maintaining the alignment of the ball bearing to very close tolerances.

A drill bushing 100 is mounted in a bushing adapter 101 secured in the lower end portion of the lower nose half 91 for positioning the drill on a tooling plate 102 which rests on a workpiece, such as the plate 110, to be drilled. The telescoping feature of the nose assembly permits quick adjustment for different lengths of drill bits 14.

OPERATION OF THE PREFERRED EMBODIMENT

Figure 3:
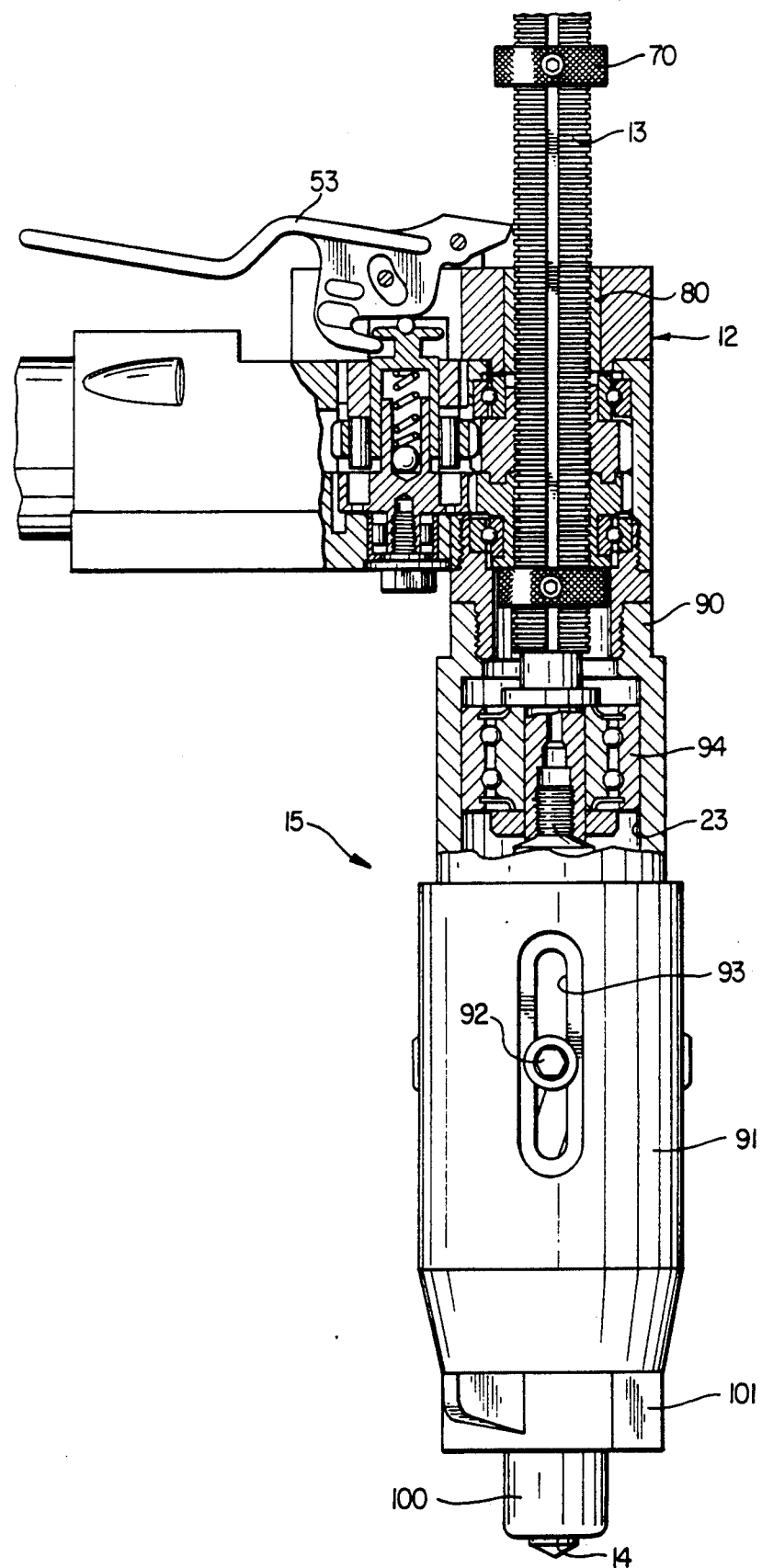
FIG. 3 is a fragmentary view in section and elevation showing the drill fully retracted.

With the spindle 13 retracted at the position of FIG. 3 at which the feed lever 53 is raised as illustrated, the drill is placed on the tooling plate 102 with the drill bushing 100 inserted through the tooling plate and the bushing adapter 101 supported on the tooling plate. The drill is then held at a position at which the tooling plate is located at a desired position on a work piece 110 to be drilled. Referring to FIG. 1, the motor 11 is started rotating the shaft 20 which drives the bevel gear 21. The bevel gear 21 drives the bevel gear 22 rotating the shaft 23 turning the idler gear 31 which meshes with the spur gear portion 30 along the shaft 23. The idler gear meshes with the main drive gear 33 turning the main drive gear which meshes with the spindle rotation gear 60 thereby turning the spindle rotation gear and the spindle 13. The feed shift lever 53 is still in the upper position of FIG. 3 so that the first feed gear 43 is not engaged with the main drive gear 33. The feed shift lever 53 is then lowered to the position of FIG. 1 moving the first spindle feed gear 43 downwardly into driving engagement with the main drive gear 33. The pins 45 engage the recess 41 and the lugs in the main drive gear so that the first feed gear is driven by the main drive gear. The first feed gear 43 meshing with the second feed gear 63 on the spindle 13 drives the feed gear 63 on the spindle at a speed greater than the rotational speed of the spindle 13. This occurs because the first feed gear is of a large diameter than the main drive gear and the second feed gear is of a smaller diameter than the main drive gear so that the gear relationship results in the second feed gear 63 turning at a somewhat greater speed of rotation than the spindle feed gear 60. The second feed gear 63 is threaded on the spindle 13, and thus, the turning of the second feed gear at a speed of rotation faster than the spindle rotation gear 60 drives the spindle 13 downwardly in the drilling mode of operation to drill a hole in the workpiece 110.

Figure 2:
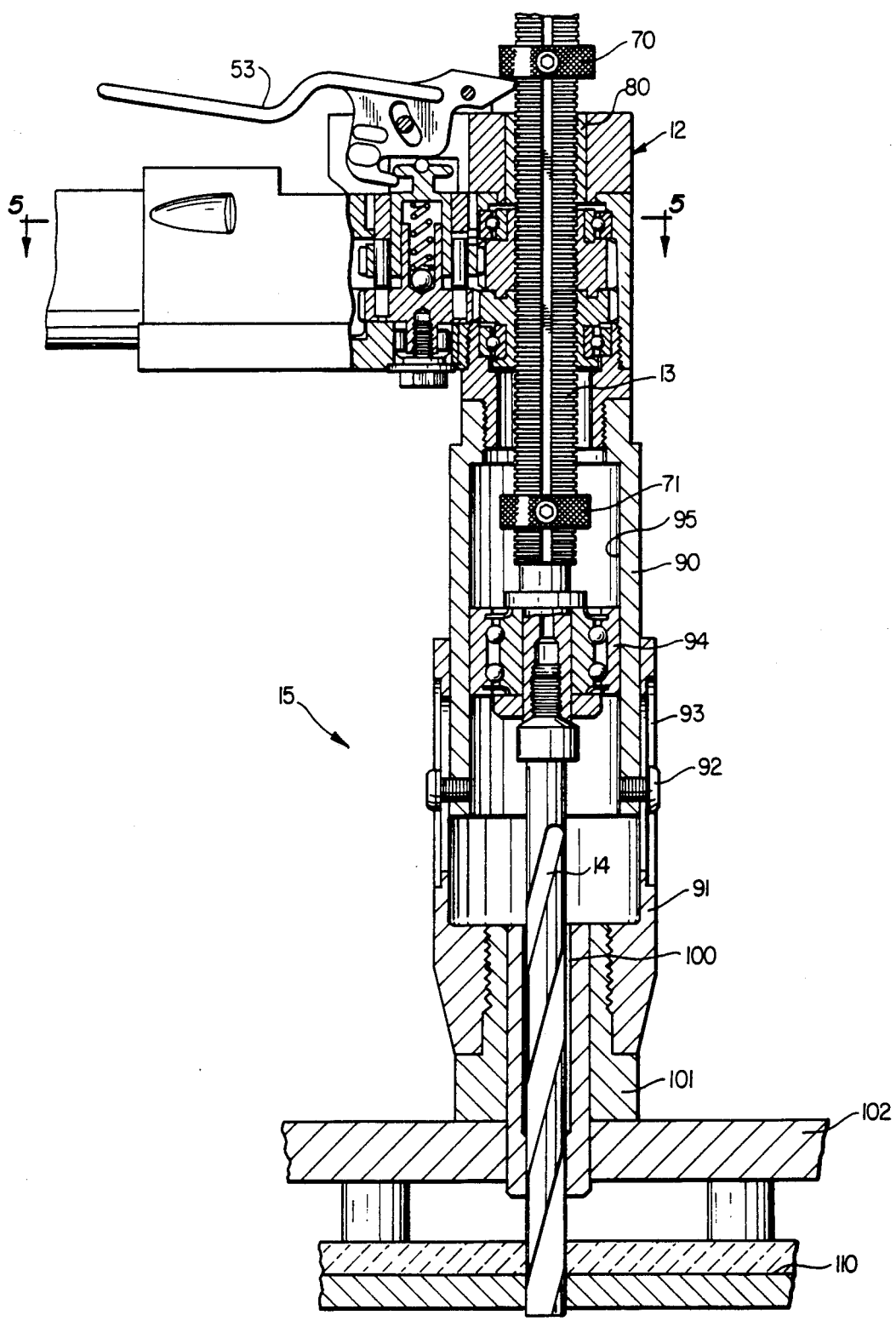
FIG. 2 is a fragmentary view in section and elevation similar to FIG. 1 showing the drill in the retracting mode.

The downward movement of the spindle 13 and drill 14 continues until the upper stop collar 70, which has been previously set at the desired depth for the hole being drilled, engages the end of the feed shift lever 53. When the stop collar engages the end of the shift lever, the shift lever pivots on the pin 54 in a clockwise direction to the position of FIG. 2. The clockwise movement of the shift lever 53 lifts the control tang 51 on the shift lever pulling the annular shoulder 50 on the first feed gear 43 upwardly lifting the first feed gear out of driving engagement with main drive gear 33 and into engagement with the stop member 55.

When the first feed gear 43 ceases to rotate, the second feed gear 63, which meshes with the first feed gear 43, also stops rotating. When this occurs, the differential in speed between the second feed gear 63 and the spindle 13 upon which the second spindle feed gear is threaded causes the spindle to start retracting moving upwardly lifting the drill bit 14 from the work piece and returning the drill to the nondrilling mode of FIG. 3. When the retraction movement reaches the point where the lower stop collar 71 on the spindle 13 engages the lower end of the drill head housing, a load is placed on the spindle feed gear 63 causing it to rotate and in turn rotate the feed gear 43. Rotation of the feed gear 43 causes rotation of the stop member 55. When the speeds are the same, the spindle 13 no longer moves upwardly or downwardly and the stop member 55 simply rotates relative to the spring loaded detents 58 in a rachet form of action, FIG. 5. The detent structure prevents damage to the drill in the event that the retraction movement occurs when the operator is not present or if he does not notice that the retraction has been completed.

When drilling a hole with the drill 10, while the spindle 13 and drill 14 are moving downwardly, and during the retraction of the spindle and drill, both the spindle and drill move within very close tolerances along the longitudinal axis of the spindle and drill so that extremely accurate holes may be drilled within acceptable tolerances without the normal reaming step needed for some prior art devices In accordance with the invention, the close fit of the flat thread crest of the threads 64 on the spindle with the bore surface of the bushing 80 allows the upper portion of the spindle to reciprocate essentially without lateral movement. Similarly, the outer race of the ball bearing unit 94 fits within very close tolerances within the bore 95 of the upper nose half-section 90 of the spindle support assembly 15 so that the bearing supported lower end portion of the spindle 13 also reciprocates within very close tolerances between the upper and lower limits of movement of the spindle. The bearing acts as a quill giving the spindle solid rigidity and holding it concentric even when extended as in FIG. 2. The drill bit bushing 100, which pilots the drill bit 14, also functions to maintain the alignment of the drill bit during drilling and retraction. The use of the two piece-nose formed by the upper nose half-section 90 and the lower nose half-section 91 permits quick adjustment for different lengths of drill bits.

While the tooling plate 102 and related structure have been illustrated as an adjunct apparatus to assist in drilling holes with the drill 10, it is to be understood that the tooling plate assembly is not part of the invention.

While the thread configuration on the spindle has been illustrated as an acme type thread, it is to be understood that other thread forms having a flat crest, such a square thread or a standard worm thread, may also be used within the scope of the invention.

It is to be further understood while the spindle support apparatus of the invention has been illustrated in a right angle positive feed type drill, such a arrangement may also be employed in other forms of drills, including, particularly, right angle peck drills, especially gun drills, and in-line lead screw drills.

What is claimed is:

1. In an automatic feed drill including a housing, a rotatable tool spindle mounted for reciprocating movement in the housing, and driving means including spindle rotation and feed gears located in the housing operably connected with the spindle for rotating and reciprocating the spindle in feeding and retraction movements, the improvement comprising:
   a closely fitting bushing in the housing around the spindle on the opposite side of the spindle rotation and feed gears from the bit driving end of the spindle;
   hollow nose means open at opposite ends and secured at a first end with the housing extending around the bit driving end portion of the spindle, the nose means having a bore defined by an inner surface concentric with the spindle; and
   a bearing secured along the driving end of the spindle in the nose means bore, the bearing including an outer member having an outer surface in sliding relation in the nose means bore whereby the nose means bore surface pilots the bearing for maintaining axial alignment of the spindle and a drill supported from the spindle during the reciprocating of the spindle in the feeding and retraction movements.

2. In an automatic feed drive in accordance with claim 1 the portion of the spindle reciprocating in the bushing being externally threaded and the crests of the threads fitting in lose sliding relation with the bore surface of the bushing.

3. An automatic feed drill in accordance with claim 2 wherein the threads on the spindle in the bushing have flat crests.

4. An automatic feed drill in accordance with claim 3 wherein the threads on the spindle in the bushing are acme type threads.

5. An automatic feed drill in accordance with claim 3 wherein the threads on the spindle are square threads.

6. An automatic feed drill in accordance with claim 1 wherein the hollow nose means is a two-piece telescoping assembly having a first section connected with the housing extending around the bit driving end portion of the spindle and the bearing and a second section in sliding relation on the first section extending endwardly from the first section around a drill bit connected with the spindle.

7. An automatic feed drill in accordance with claim 2 wherein the hollow nose means is a two-piece telescoping assembly having a first section connected with the housing extending around the bit driving end portion of the spindle and the bearing and a second section in sliding relation on the first section extending endwardly from the first section around a drill bit connected with the spindle.

8. An automatic feed drill in accordance with claim 3 wherein the hollow nose means is a two-piece telescoping assembly having a first section connected with the housing extending around the bit driving end portion of the spindle and the bearing and a second section in sliding relation on the first section extending endwardly from the first section around a drill bit connected with the spindle.

9. An automatic feed drill in accordance with claim 4 wherein the hollow nose means is a two-piece telescoping assembly having a first section connected with the housing extending around the bit driving end portion of the spindle and the bearing and a second section in sliding relation on the first section extending endwardly from the first section around a drill bit connected with the spindle.

10. An automatic feed drill in accordance with claim 5 wherein the hollow nose means is a two-piece telescoping assembly having a first section connected with the housing extending around the bit driving end portion of the spindle and the bearing and a second section in sliding relation on the first section extending endwardly from the first section around a drill bit connected with the spindle.

11. An automatic feed drill in accordance with claim 1 including a bushing adapter on the free end of the hollow nose means and a drill bushing mounted in the bushing adapter, the drill bushing having a bore for receiving and guiding a drill bit secured with the spindle and having a drilling end extending through the drill bit bushing.

12. An automatic feed drill in accordance with claim 6 including a bushing adapter secured in the free end of the second section of the nose assembly extending endwardly therefrom and a drill bit bushing mounted in the bushing adapter having a bore for receiving and guiding a drill bit connected at one end with the spindle and extending at an opposite drill end through the drill bit bushing.

13. In an automatic feed drill including a housing, a rotatable tool spindle mounted for reciprocating movement in the housing, a driving motor connected with the housing having a drive shaft, and driving means connected with the drive shaft and including spindle rotation and feed gears coupled with the spindle located in the housing for rotating and reciprocating the spindle in feeding and retraction movements, the improvement comprising:
the spindle being provided with external feed threads having flat crests;
a bushing mounted in the housing around the spindle along a portion of the spindle on the opposite side of the spindle rotation and feed gears from the bit driving end of the spindle, the bushing having a tubular bore defined by a bore surface fitting in close sliding relation with the crests of the threads on the spindle for piloting the end portion of the spindle opposite the drill bit end of the spindle during the reciprocating movements of the spindle;
a hollow two-piece tubular telescoping nose assembly having a first section secured at a first end with the housing and extending from the housing around the drill bit end of the spindle, the first nose assembly section having a tubular bore concentric with the spindle, the second nose assembly section fitting along one end portion in telescoping relation on a second end portion of the first nose assembly section, the second nose assembly section having longitudinal slots along opposite sides of the section, set screws through the slots in the second nose assembly section into the lower outer end portion of the first nose assembly section for connecting the nose assembly sections together and permitting sliding telescoping adjustment of the second nose assembly section on the first nose assembly section, the second nose assembly section including a tubular bushing adapter having a bore concentric with the axis of the first and second nose assembly sections, and a drill bit bushing in the bushing adapter having a bushing bore concentric with the axis of the first and second nose assembly sections for piloting a bit secured with the bit driving end of the spindle; and
a ball bearing assembly mounted on the bit driving end of the spindle, the ball bearing assembly having an inner race mounted on the spindle and an outer race having an outer surface fitting in sliding relation with the bore surface of the first nose assembly section whereby the bore of the nose assembly section pilots the ball bearing assembly and drill bit end of the spindle as the spindle reciprocates during feeding and retraction movements.

14. An automatic feed drill in accordance with claim 13 wherein the threads on the spindle are acme threads.

15. An automatic feed drill in accordance with claim 13 wherein the threads on the spindle are square threads.

16. In a automatic feed drill including a housing, a rotatable tool spindle mounted for reciprocating movement in the housing, and drive means for rotating and reciprocating the spindle in feeding and retraction movement, the improvement comprising;
hollow nose means open at opposite ends secured at a first end with the housing extending around the bit driving end portion of the spindle, the nose means having a bore defined by an inner surface substantially concentric with spindle; and
a bearing assembly secured along the driving end of the spindle in the nose means bore, the bearing assembly including an outer member having an outer surface operative in sliding relation in the nose means bore whereby the nose means bore surface pilots the bearing assembly for maintaining axial alignment of the spindle and a drill supported from the spindle during the reciprocating of the spindle in feeding and retraction movements.

17. An automatic feed drill in accordance with claim 16 wherein the hollow nose means is a two-piece telescoping assembly having a first section connected with the housing extending around the bit driving end portion of the spindle and the bearing and a second section in sliding relation on the first section extending endwardly from the first section around a drill bit connected with the spindle.

18. An automatic feed drill in accordance with claim 17 including a bushing adapter secured in the free end of the second section of the nose assembly extending endwardly therefrom and a drill bit bushing mounted in the bushing adapter having a bore for receiving and guiding a drill bit connected at one end with the spindle and extending at an opposite drill end through the drill bit bushing.

19. An automatic feed drill in accordance with claim 16 wherein said nose means is a hollow two-piece tubular telescoping nose assembly having a first section secured at a first end with the housing and extending from the housing around the drill bit end of the spindle, the first nose assembly section having a tubular bore concentric with the spindle, the second nose assembly section fitting along one end portion in telescoping relation on a second end portion of the first nose assembly section, the second nose assembly section having longitudinal slots along opposite sides of the section, set screws through the slots in the second nose assembly section into the lower outer end portion of the first nose assembly section for connecting the nose assembly sections together and permitting sliding telescoping adjustment of the second nose assembly section on the first nose assembly section, the second nose assembly section including a tubular bushing adapter having a bore concentric with the axis of the first and second nose assembly sections, and a drill bit bushing in the bushing adapter having a bushing bore concentric with the axis of the first and second nose assembly sections for piloting a bit secured with the bit driving end of the spindle.

* * * * *